United States Patent [19]

de Bruin et al.

[11] 4,256,030
[45] Mar. 17, 1981

[54] DEVICE FOR MAKING COFFEE OR THE LIKE

[75] Inventors: Jan de Bruin, Bosch; Joseph H. Klomp, Bilthoven, both of Netherlands

[73] Assignee: Koninklijke Fabriek Inventum Fabriek van instrumenter en elektrische apparaten N.V., Netherlands; 10

[21] Appl. No.: 10,063

[22] Filed: Feb. 7, 1979

[30] Foreign Application Priority Data

Apr. 19, 1978 [NL] Netherlands .................. 7804153

[51] Int. Cl.³ ............................................. A47J 31/00
[52] U.S. Cl. ........................................ 99/295; 99/316

[58] Field of Search .............. 99/275, 280, 289, 295, 99/297, 302 P, 316–319

[56] References Cited

U.S. PATENT DOCUMENTS

| 3,719,505 | 3/1973 | Mazza | 99/275 |
| 3,754,463 | 8/1973 | Vernooy | 99/295 |

*Primary Examiner*—Leonard D. Christian
*Attorney, Agent, or Firm*—Rodgers & Rodgers

[57] ABSTRACT

A multiple unit device for making coffee or the like is especially well adapted for use on aircraft and comprises a cradle, a substructure mounted on the cradle, a holder for receiving a container of coffee or the like and disposed on the substructure, a boiler unit disposed behind the holder, a control unit, and means for perforating the container.

16 Claims, 17 Drawing Figures

FIG. I.

DEVICE FOR MAKING COFFEE OR THE LIKE

The invention relates to a device for making coffee or the like, comprising a boiler, a compartment for lodging a container (such as a tin) containing coffee of the like, means for pressing a perforating member through the container and a holder for the coffee or the like produced.

The conventional devices of the kind set forth, which may be employed in aircraft or the like, are usually constructed integrally in a number of parts, which renders manufacture and particularly maintenance difficult. However, for such use in aircraft or the like, such devices should be easy to maintain and, as the case may be, to repair.

According to the invention this can be achieved by providing the device with a number of detachably intercoupled units, in which a first unit is formed by a substructure for receiving a holder for the coffee or the like, a second unit arranged above the first unit by the compartment for housing the container, a third unit disposed above the first unit and behind the second unit by the boiler and a fourth unit disposed above the second unit by the means for pressing a perforating member through the top side of the container.

By using such a structure the device will have a compact construction, in which the various parts can be readily replaced independently of one another, so that maintenance and repair are materially facilitated as compared with the devices of the prior art.

It is advantageous to provide the device with a sensing member which is displaceable in a direction of height between a lowermost position, in which the sensing member is located in the coffee holder for sensing the liquid level in the holder and for preventing the holder from shifting laterally in place, and a topmost position, in which the holder can be taken out of the device. In this way the sensing member will fulfil two functions.

The invention will be described more fully hereinafter by way of example with reference to an embodiment of the invention illustrated in the accompanying figures, wherein:

FIG. 9 is a front view of the unit receiving a container containing coffee or the like;

FIG. 13 is a sectional view of a trough for holding a container containing coffee or the like;

FIG. 16 is a plan view of the unit for perforating the container containing the coffee or the like.

Figure 1:
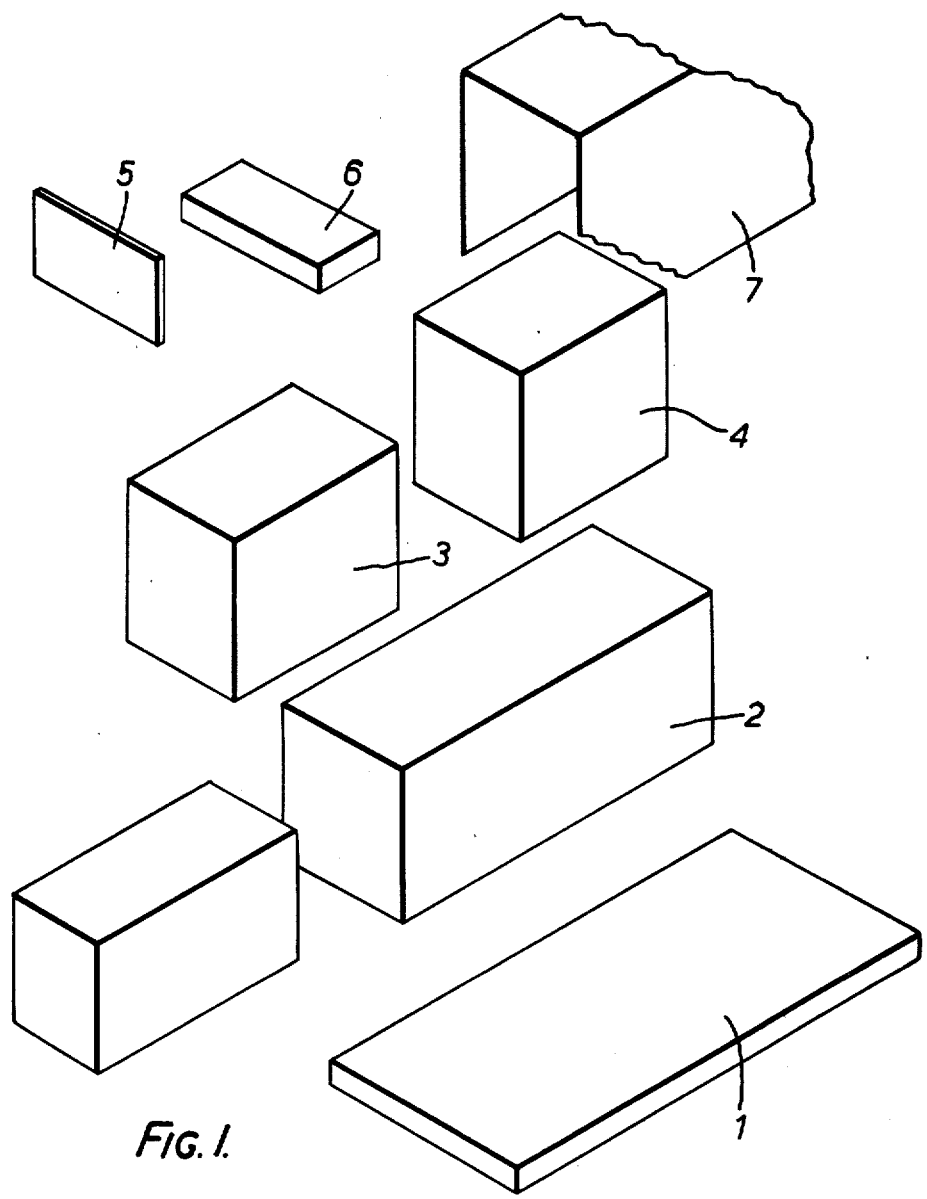
FIG. 1 shows schematically and perspectively the various units at a distance from one another for the structure of the device in accordance with the invention.

FIG. 1 shows schematically that the device for making coffee or the like is composed of a number of units, to wit, a cradle 1, a substructure 2 to be placed on the cradle, a holder 3 to be disposed on the foremost part of the substructure 2 for receiving a container such as a tin containing coffee or the like, a boiler unit 4 to be disposed behind said holder on the substructure 2, a control unit 5 to be arranged above the holder 3, which may be provided with control knobs, signalling lamps and the like and a unit 6 to be disposed behind the former and above the holder 3 for perforating a tin disposed in the holder 3.

The units located above the substructure 2 can be covered by a sheath 7.

Figure 2:
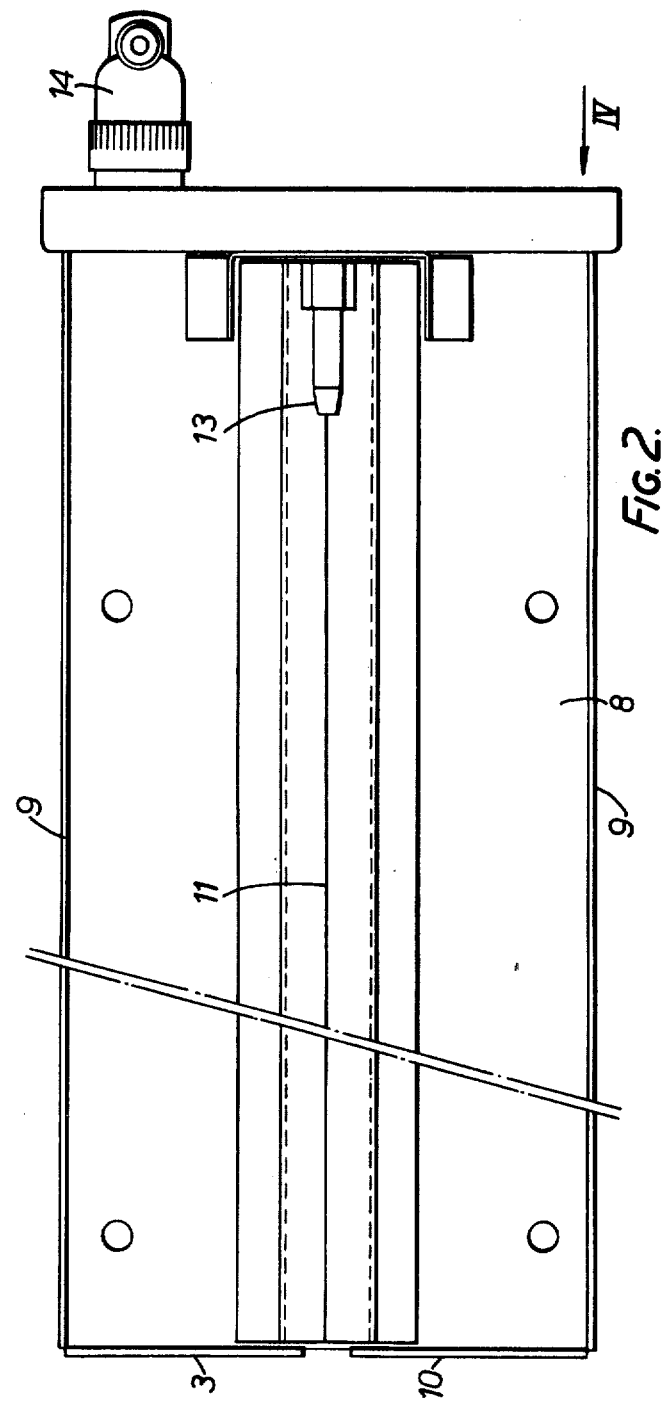
FIG. 2 is a plan view of a cradle for the device in accordance with the invention.
Figure 3:
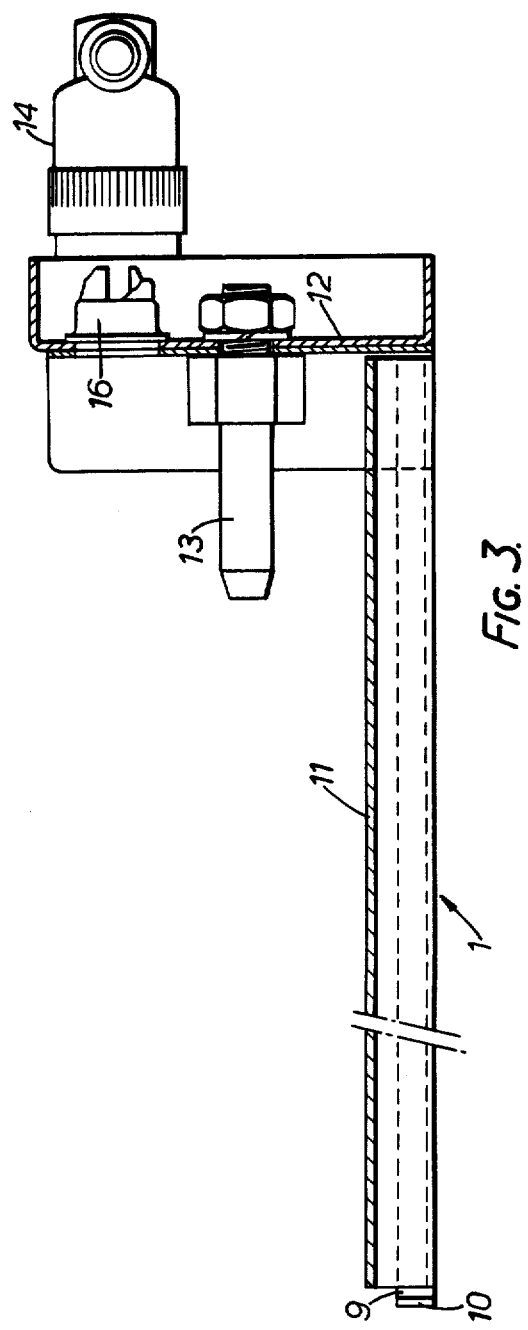
FIG. 3 is a sectional view of the cradle of FIG. 2.
Figure 4:
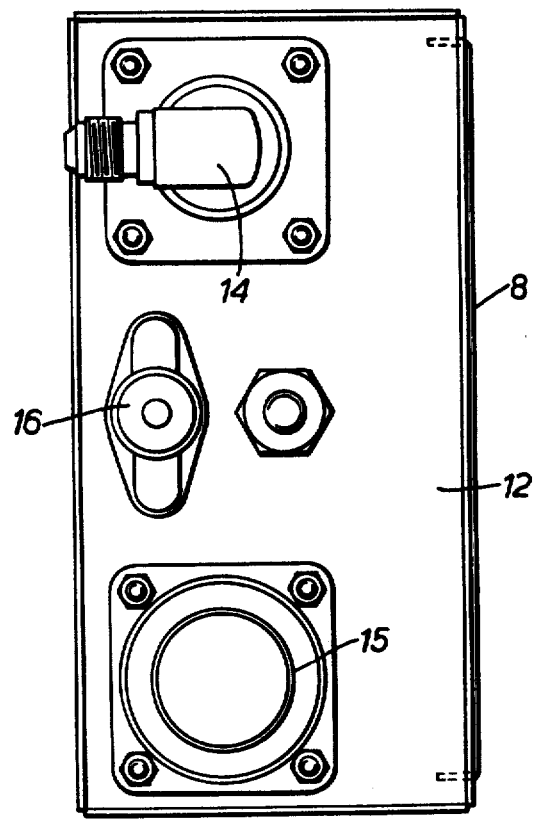
FIG. 4 is an elevational view in the direction of the arrow IV in FIg. 2.

Referring to FIGS. 2 to 4, the cradle comprises a flat plate 8, whose side edges 9 and rear edges 10 extending in the direction of length of the cradle are bent over at right angles for stiffening the plate. At the centre, the plate 8 has a profile 11 of traingular cross-section and extending in the direction of length of the plate. On the rear side of the plate is fastened at right angles thereto a support 12 holding a centering pin 13 extending in the longitudinal direction of the cradle and being located centrally above the profile 11. The support 12 has fastened to it a coupling piece 14 for connection with a water conduit and an electric connecting plug 15 for connection to the electric mains. The support 12 has furthermore a locking member 16.

The cradle of this structure can be mounted in an aircraft or the like, whilst it can be connected by means of the coupling piece 14 with the water mains of the aircraft and by means of the connecting plug 15 with the electric mains of the aircraft or the like.

Figure 5:
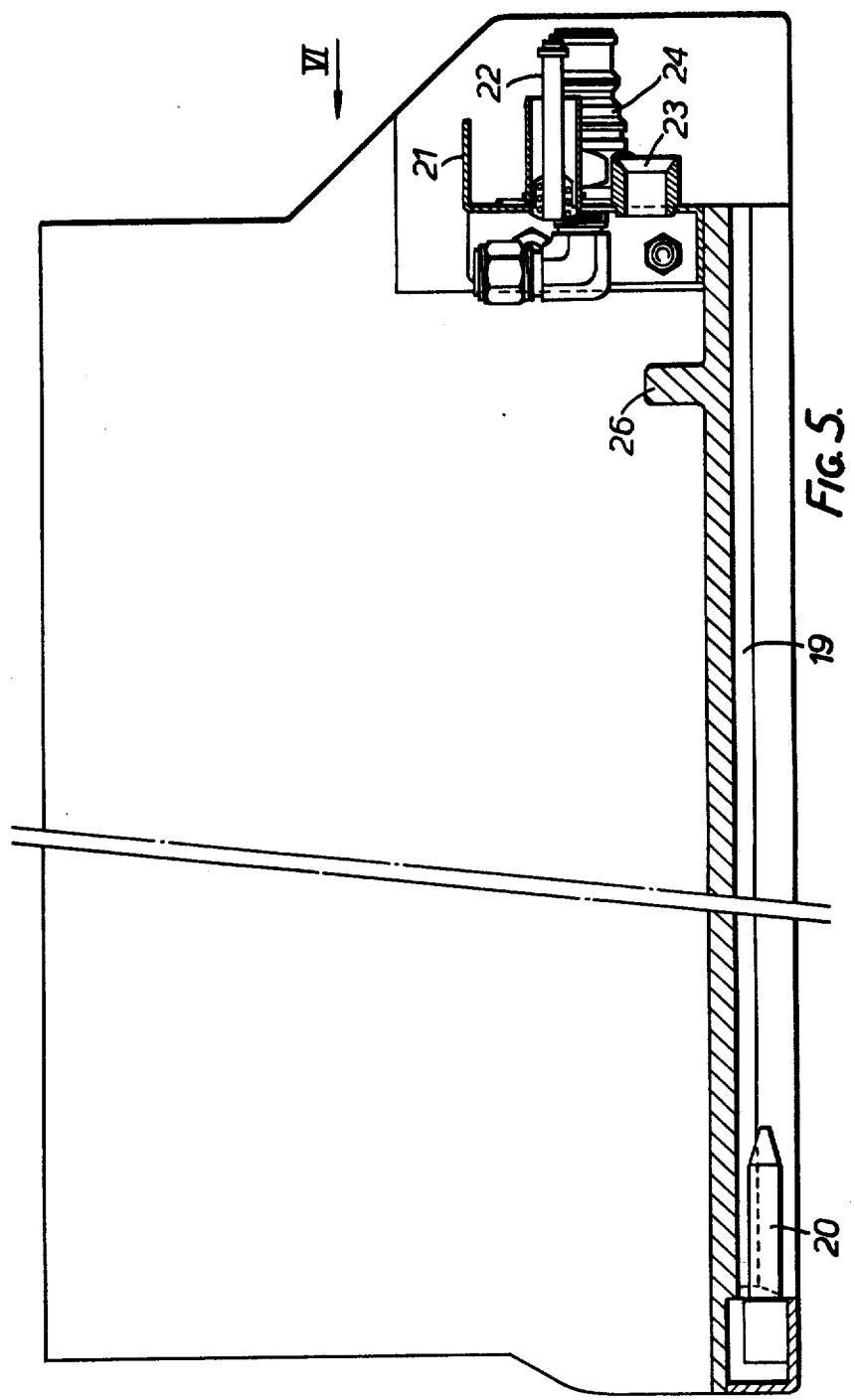
FIG. 5 is a sectional view of the substructure of the device.
Figure 6:
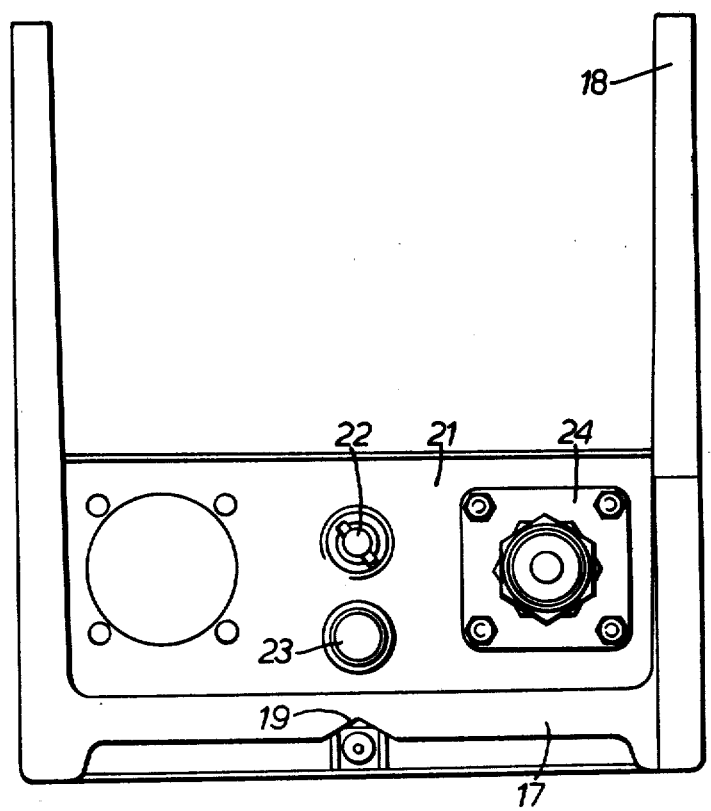
FIG. 6 is an elevational view of the substructure of FIG. 5 in the direction of the arrow VI in FIG. 5.
Figure 7:
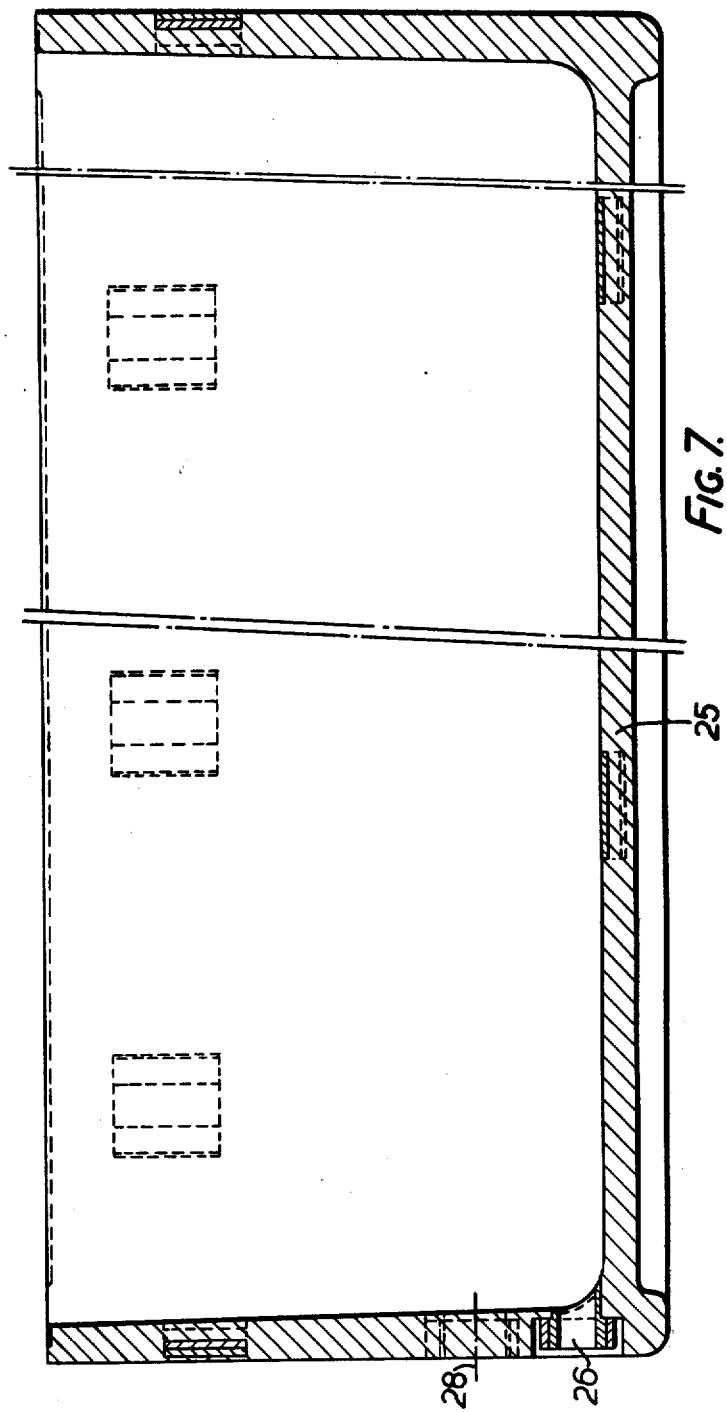
FIG. 7 is a sectional view of a holder for receiving the coffee or the like to be prepared to be placed in the substructure.

On the cradle 1 thus mounted in the aircraft can be disposed the substructure shown in FIGS. 5 and 6. This substructure is preferably made at least for the major part from integral polyurethane foam having self-quenching properties and is provided with a bottom 17 and two relatively parallel sidewalls 18.

The lower side of the bottom has a V-section groove 19, which will bear on the cradle when the substructure is put in place on the correspondingly shaped profile 11. The ends of the sidewalls 18 projecting below the bottom will lie outside the bent-over rims of the cradle and will glide along the plate.

A centering pin 20 at the front of the substructure gets into the interior of the profile 11, when the substructure is in its definite position on the cradle.

On the rear side of the bottom, between the ends of the sidewalls 18 projecting beyond the rear side of the bottom, is fastened a support 21, provided with a locking pin 22, a sleeve 23, a connecting nipple 24 and a contact box (not shown) to be arranged in an opening 25 in the support 21. When the substructure is slid on the cradle shown in FIGS. 2 to 4, the centering pin 13 will engage the sleeve 23, whereas the locking pin 22 enters the nipple 16 for locking the substructure to the cradle. In a similar manner the nipple 24 is automatically connected with the coupling piece 14, whereas the contact box on the support 21 is connected to the connecting plug 15.

Between the upwardly extending walls 18 of the substructure is to be placed a holder or reservoir formed by a rectangular trough 25 (FIG. 1) for collecting the coffee or the like produced. This trough 25 is also preferably made from integral polyurethane foam having self-quenching properties.

The front wall of the trough has a connecting nipple 26 for connecting a tap cock or the like with the trough.

If the trough is made from integral polyurethane foam, its insulating properties are such that it need not be heated additionally and that the temperature of the liquid contained in the trough drops at the most 3° C. an hour.

The position of the trough 25 in the substructure is defined by a transverse ridge 26 provided near the rear side of the substructure and being integral with the bottom, said ridge limiting the shift of the trough into the substructure. The front side of the trough preferably has a level gauge 28 indicating a level of 1 to 1.5 liters in the trough so that when the coffee reaches this level gauge, a fresh quantity of coffee may be prepared.

Figure 8:
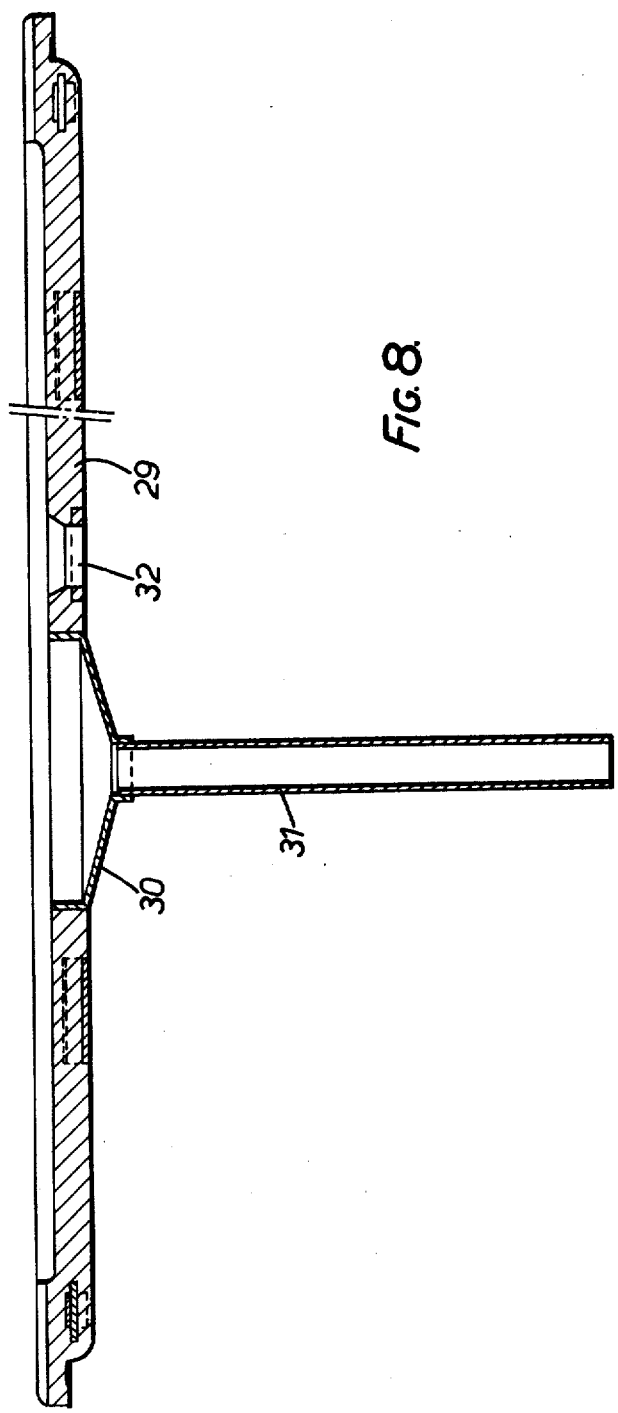
FIG. 8 is a sectional view of the lid for the holder shown in FIG. 7.

The trough is closed on top by the lid 29 shown in the sectional view of FIG. 8 and fastened to the top side of the trough in a manner not shown.

The lid has a comparatively large hole, in which a funnel-shaped member 30 is fastened, with which communicates a pipe 31 extending downwards in the trough. The lid has a further hole 32. The purpose of the parts 30 to 32 will be explained more fully hereinafter.

On top of the front end of the substructure can be disposed and screwed thereinto the compartment shown in FIGS. 9 to 12 for receiving a container such as a tin containing coffee or the like. The compartment has a top wall 33 having a bent-over front rim 34, a bottom plate 35, relatively parallel sidewalls 36 and 37 having front rims 38 and 39 bent over at right angles and a rear wall 40.

Between the sidewalls 36 and 37, near the open front, a door 41 is pivotally coupled with the sidewalls by means of horizontal hinges 42 located near the top side of the door. A stop 43 located above the hinges 42 prevents an outward turn of the top side of the door. In the position shown in the figures the door is held in place with the aid of a locking arm 45 loaded by a spring 44 and being in contact with a lug 46 integral with the lid 41 in the position shown in the figure, whilst its end projecting out of the compartment can be turned upwards against the spring force in order to allow the door to be opened.

To the top wall 33 is furthermore fastened a box-shaped member 47, which serves, as will be explained more fully hereinafter, for limiting an upward movement of a tin containing coffee or the like and being arranged in said compartment. To the front side of the bottom plate 35 is secured a plate 48, the inner rim 49 of which is folded upwards so that this inner rim 49 extends at a given distance from the open front and parallel to said open front of the compartment. The portion of the bottom plate 35 located between the upright rim 49 and the rear wall 40 is provided with a stuffing plate 51 having an opening 50. The bottom plate 35 has furthermore a hole 52, which is located, when the device is mounted, above the funnel-shaped member 30 in the lid 29 of the trough 25, when the trough is arranged in the device.

The top wall 33 has a round hole 53 and an elongated hole 54 communicating with the former so that the hole 53 is concentrically surrounded by the box-shaped member 47.

The rear wall 40 of the unit is provided with a U-shaped support 55, whose limbs extending parallel to one another at right angles to the wall 40 guide a vertically extending tube 57 with the interposition of insulating sleeves 56.

The wall of the tube has opposite one another a hole 58 and a circular hole 58b for receiving the end of a limb 59 of a L-shaped setting member having a further limb 60. The limb 60 of the setting member extends along the outer side of the sidewall 36 of the unit and is journalled in brackets 61 fastened to said sidewall 36 so as to be rotatable about its longitudinal axis.

Figure 9:
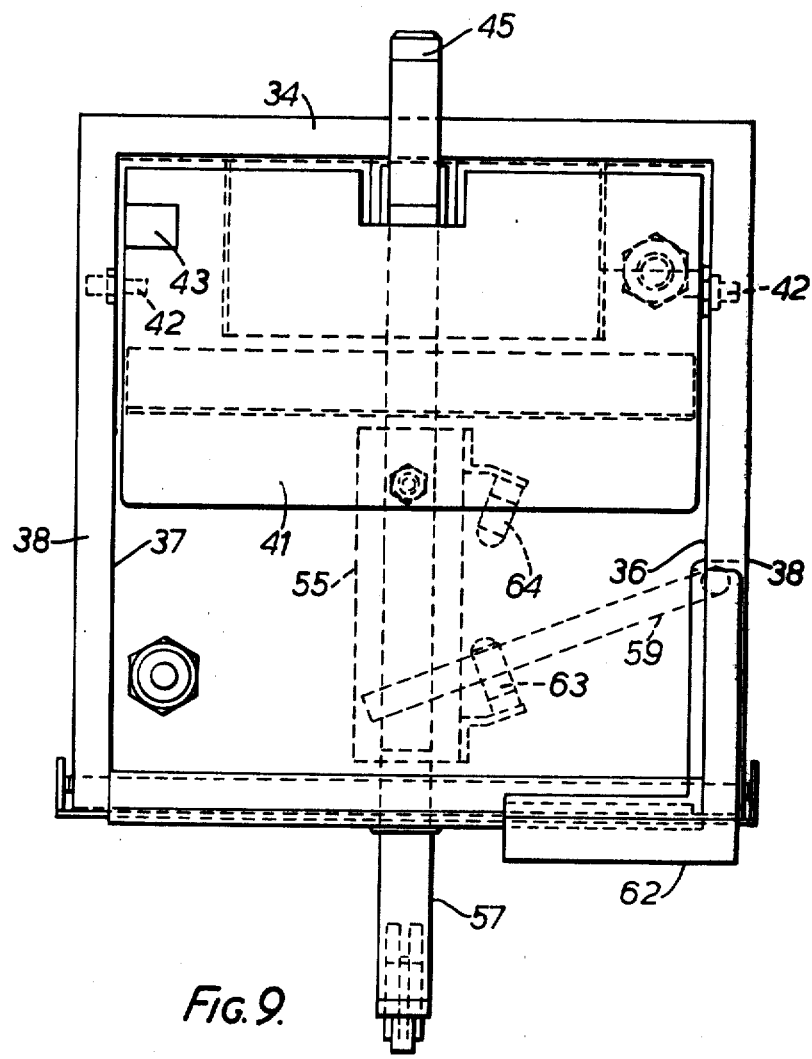

To the end of the limb 60 located near the front side of the unit is fastened an L-shaped handle 62 in a manner such that, in the position of the handle 62 shown, one limb extends vertically downwards and the other limb is parallel to the bottom plate 35 so that part of this limb projects over a given distance below the bottom plate. In this position of the handle 62 the tube 57 is in its lowermost position, whilst the limb 59 of the setting member coupled with the tube 57 is retained with the aid of a co-operating leaf spring 63 (FIG. 9). By turning the handle 62 out of the position shown in FIG. 9 in clockwise direction the tube 57 can be shifted upwards and be locked in the higher position by means of a leaf spring 64 co-operating with the limb 59. In this position the handle 62 is completely located above the bottom plate 35.

In the mounted state of the device the tube 57 extends in its lowermost position through the hole 32 in the lid 29 of the holder 25, when the latter is disposed in the device. The tube 57 thus guards the holder with respect to the device. The tube 57 furthermore serves in known manner as an electrically operating lever indicator so that, when the level of the liquid in the trough 25 reaches the lower end of the tube 57 in the trough, the electric leads 65 and 66 supply an electric signal for a purpose to be described more fully hereinafter.

In the position of the handle 62 and of the tube 57 shown in the figures the end of the handle projecting below the bottom plate 35 will be located in front of the trough 25 in the device so that this trough cannot be removed from the device. Not until the handle 62 has been turned and the tube 57 has thus been withdrawn from the trough, can the trough 25 be taken out of the device.

Figure 13:
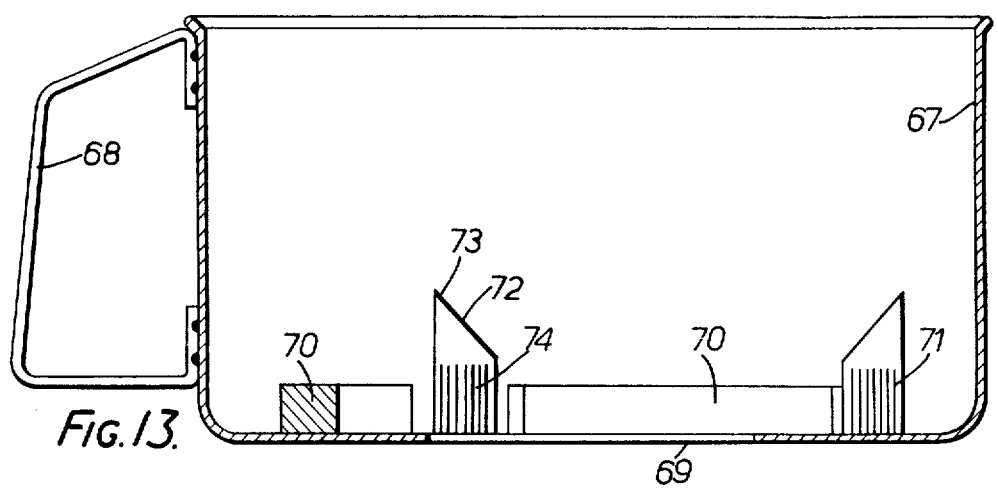

For loading the unit shown in FIGS. 9 to 12 with a tin containing coffee or the like the cup-shaped holder 67 of FIG. 13 is used: it is provided with a handle 68. The bottom of the holder 67 has a hole 69, which is located above the opening 50 in the packing 51 when the holder is introduced into the unit shown in FIGS. 9 to 12. The holder is then locked between the rear wall 40 and the upright rim 49 of said unit.

Inside the holder 67 a few ridges 70 are concentric with the opening 69 for limiting a downward movement of a tin containing coffee or the like placed in the holder 67. Between the ridges are fastened three perforating members 71 extending upwards from the bottom plate and having, in a horizontal sectional area, a triangular shape. The perforating members are bevelled so that on top they are bounded by a sloping surface 72, which gradually widens downwardly from a corner 73. The side faces of the perforating members have grooves 74.

Figure 10:
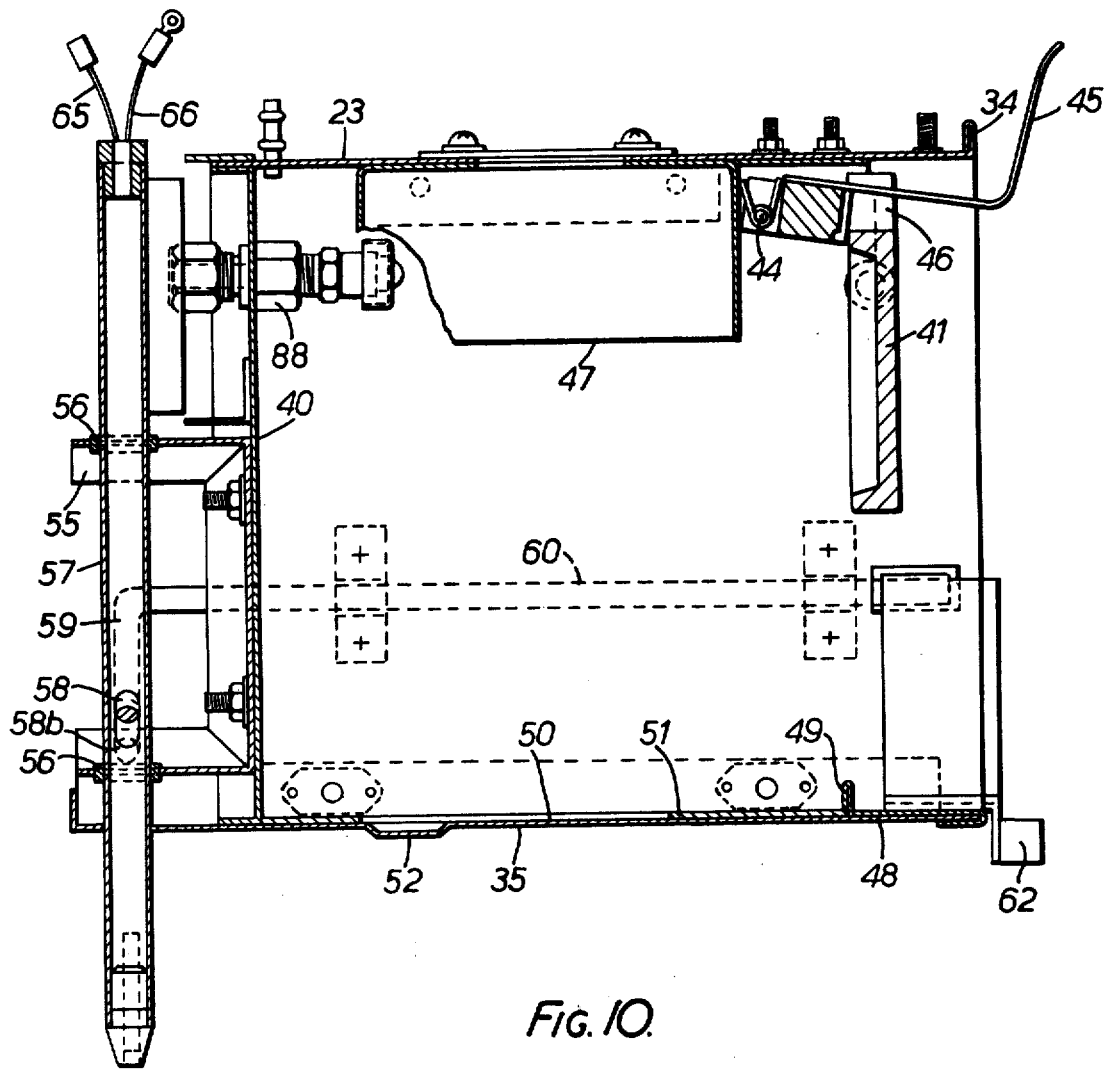
FIG. 10 is a sectional view of the unit of FIG. 9.
Figure 11:
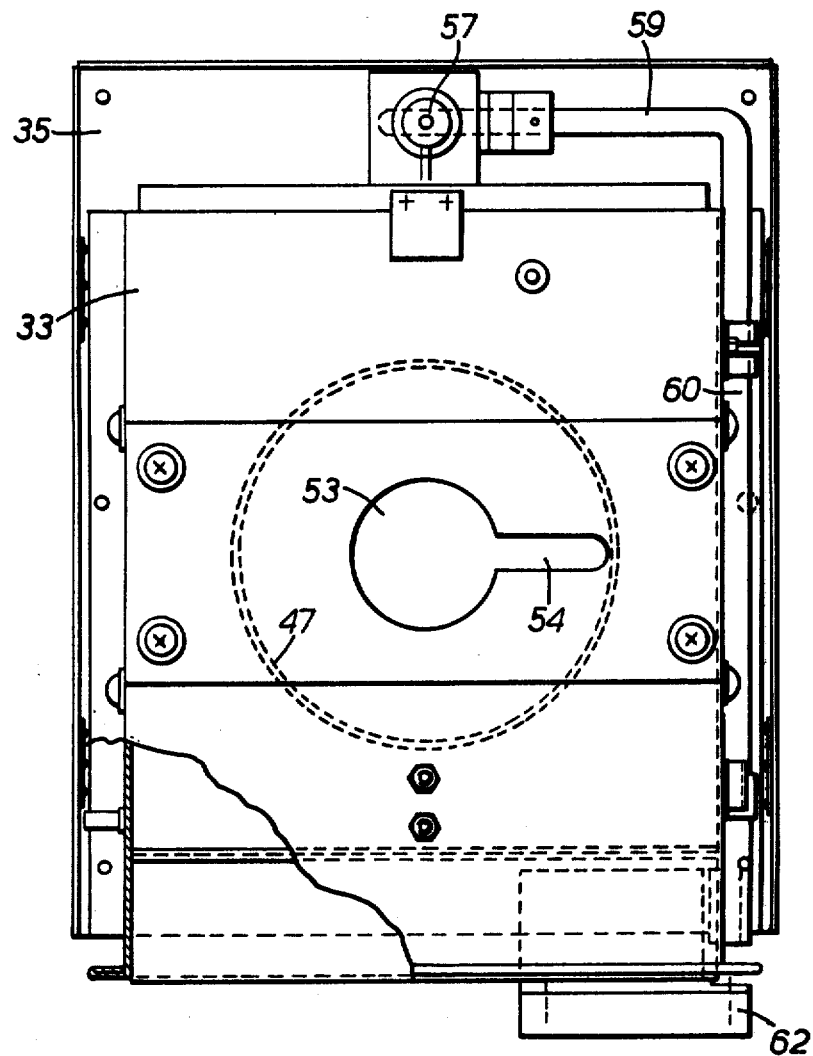
FIG. 11 is a plan view of the unit of FIG. 9.
Figure 12:
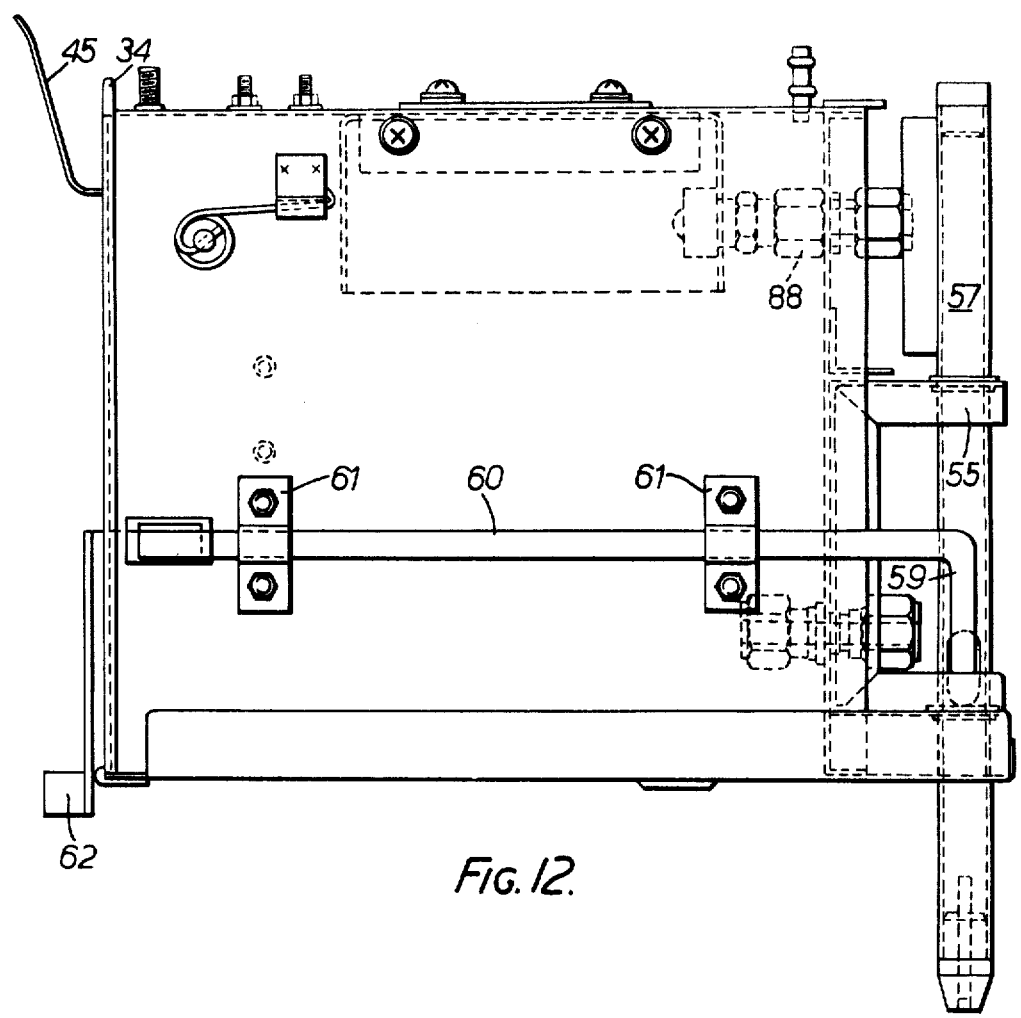
FIG. 12 is a side elevation of the unit of FIG. 9 in the direction of the arrow XII in FIG. 9.

A tin containing coffee or the like can be placed in the trough 67 on the tips 73 of the perforating members and after the lid 41 is opened it can be slipped into the unit shown in FIGS. 9 to 11.

Figure 14:
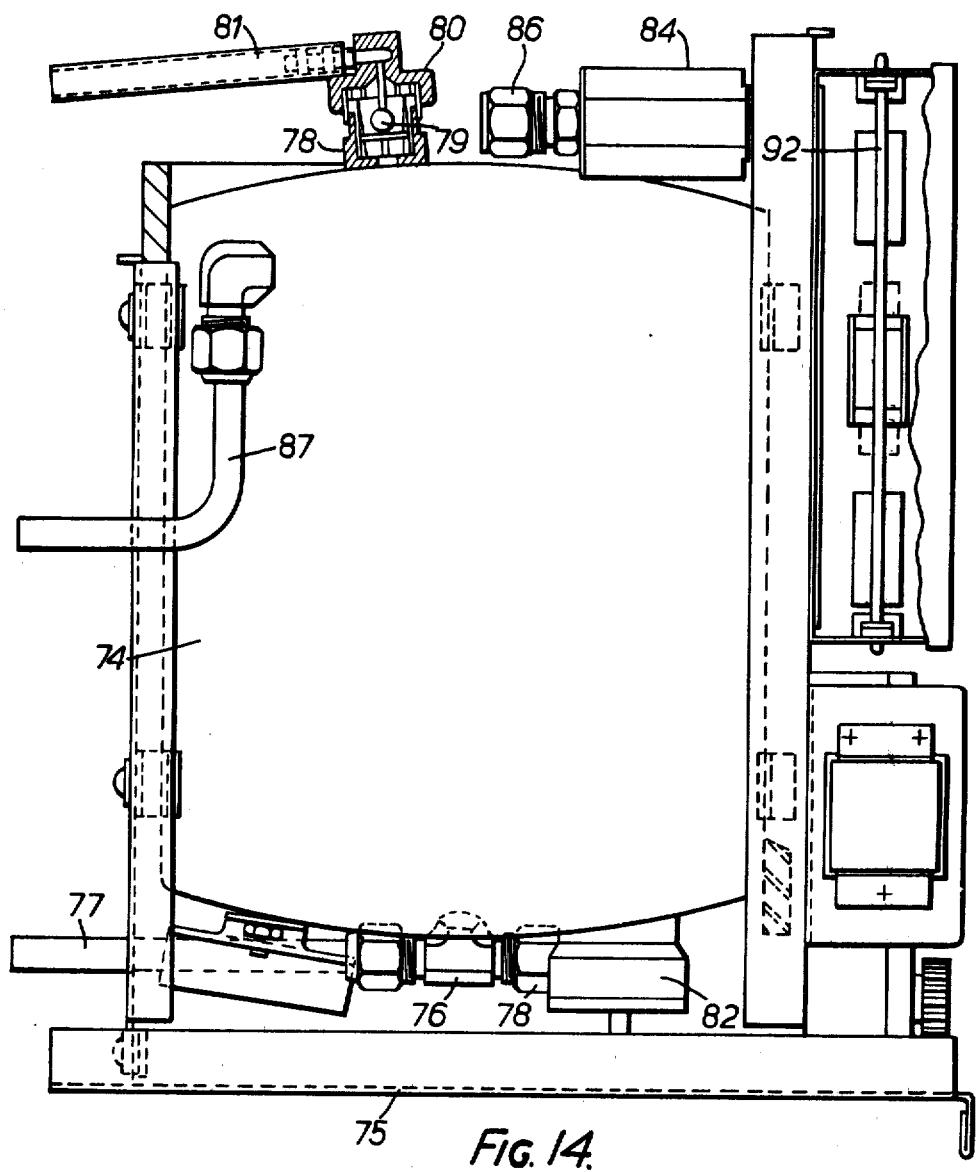
FIG. 14 is an elevational view of the boiler.
Figure 15:
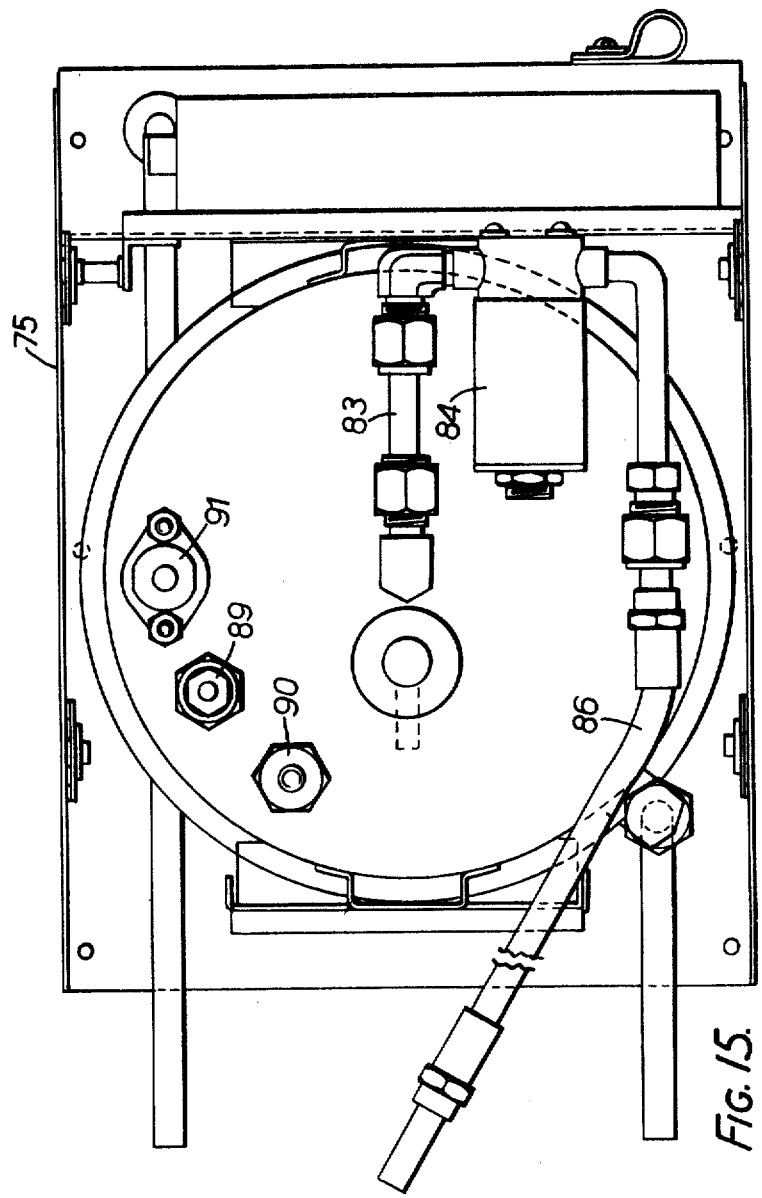
FIG. 15 is a plan view of the boiler of FIG. 14.

The boiler shown in FIGS. 14 and 15 is fastened behind the unit shown in FIGS. 9 to 13 to the top side of the substructure with the aid of a frame 75 supporting the boiler 74.

The lower side of the tank 74 has fastened to it a T-nipple 76 for connecting a filling duct 77 and a tap duct 78. The filling duct can be connected with the aid of connecting means (not shown) with the connecting nipple 24 (FIG. 5).

The tap duct (not shown) may be used for emptying the boiler.

On top of the tank 74 is fastened a housing 78, whose interior communicating with the interior of the tank contains a float 79, which is adapted to co-operate with a seat 80 arranged above the float. With the housing is connected a hose 81 leading to the interior of the unit shown in FIGS. 9 to 12 for conducting away any leakage water. When the tank is filled, air can escape about the float 79 through the valve seat 80 and the hose 81 and when the water reaches the float 79, the latter is pressed against the seat 80 so that water cannot escape from the tank. By using this construction the tank can be filled in about 45 seconds.

Through the bottom side of the tank a few heating elements 82 are arranged on the tank.

On top of the tank an outlet duct 83 communicates through a magnet valve 84 with a further outlet duct 86.

With the tank communicates furthermore a duct 87, which is connected with a pressure discharge valve 88 (FIG. 10) arranged in the unit shown in FIGS. 9 to 12 and opening when the pressure in the tank exceeds a predetermined value. Via this unit the water emanating from the valve 88 can flow out through the hole 52.

A thermostat 89 is arranged on the top side of the boiler for controlling the water temperature, whilst a level sensor 90 and an overheating switch 91 are furthermore provided. On the rear side of the boiler a printed circuit 92 is arranged as part of the electric circuit (not shown) of the device for making coffee or the like.

Figure 16:
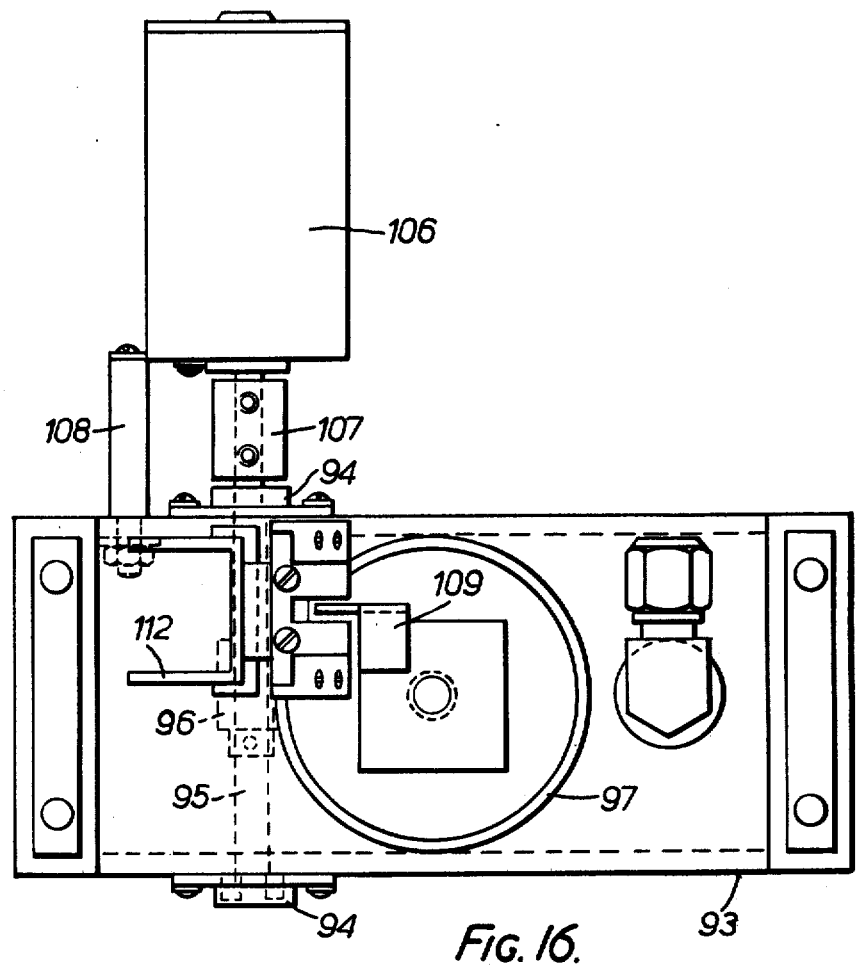
Figure 17:
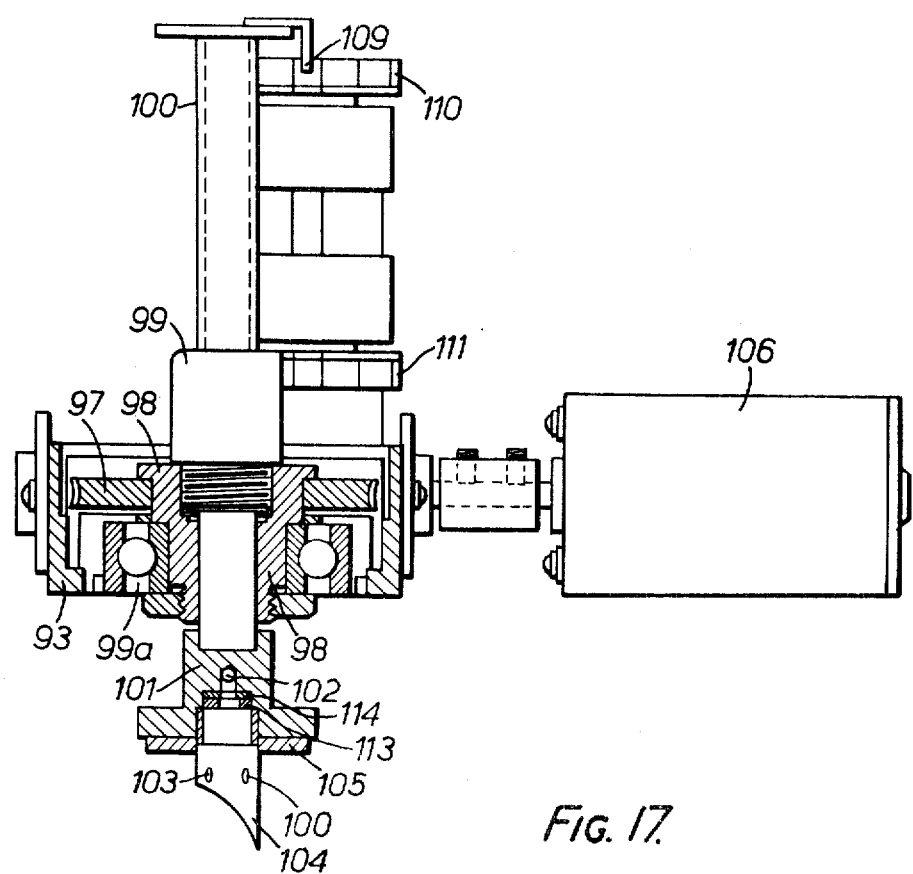
FIG. 17 is a sectional view of the unit of FIG. 16.

On the top side of the unit shown in FIGS. 9 to 12 can be fastened the perforation unit shown in FIGS. 16 and 17 with the beam 93, forming part of said unit. This beam is provided with bearings 94 for supporting a shaft 95 extending transversely of the direction of length of the beam and having a worm 96.

The worm 96 is in engagement with a worm wheel 97 fastened to a sleeve 98, which is supported with the aid of a ball bearing 99a in the beam 93 so as to be freely rotatable.

The sleeve 98 has connected with it a nut 99 accommodating a spindle 100, which can be moved up and down in its direction of length by turning the nut 99 with the aid of the worm wheel 97.

To the lower end of the spindle 100 is fastened a coupling piece 101 having a passage 102, with which communicates (in a manner not shown) the duct 86 from the boiler with the aid of a flexible tie piece. This passage furthermore communicates with apertures 103 in a perforating tip 104 screwed onto the tie piece 101 and surrounded by a stuffing ring 105 joining the coupling piece 101.

Between the releasable perforating tip 104 and the tie piece 101 are arranged a stuffing ring 113 and a restriction disc 114. This restriction disc 114 limits the rate of flow of the water from the boiler to the coffee tin.

The worm wheel 96 is driven by an electric motor 106, the output shaft of which is connected via a coupling piece 107 with the shaft 95. The motor 106 is connected via a support 108 with the beam 93.

With the top end of the spindle 100 is connected a sensing member 109, which is movable between two terminal switches 110 and 111 for limiting the upward and downward movement of the spindle 100. These terminal switches 110 and 111 are preferably adjustable in a direction of height on a support 112 arranged on the beam so that the stroke of the spindle 100 can be adapted to the height of the tins to be used in the device.

The unit 5 shown only schematically in FIG. 1, arranged in the device in front of the perforation unit described above comprises a switch included in the electric circuit for switching the device on and off and, if desired, signalling lamps or the like indicating given functions or operations of the device.

It will be obvious that the units 2 to 7 described in detail can be readily assembled and be locked on the cradle in an aircraft or the like.

Furthermore, the device can be readily removed from the cradle for maintenance or repair and the units can be readily uncoupled for replacement and/or repair of a defective unit, so that repairs and maintenance can be rapidly carried out.

Before the device is operated, the reservoir 25 is put in place and locked in place with the aid of the sensor 57 and the handle 62. Then a tin containing coffee or the like can be placed on the top ends of the perforating members 71, after which the trough 67 can be put on the bottom plate 35. Subsequently the lid 41 is closed so that coffee is prevented from escaping from the tin when coffee is being made.

Then with the aid of the switch the device can be actuated so that the water in the tank is heated.

By the action of the electric motor 106 the perforating tip 104 will be pressed through the top side of the tin, after which the tin is pressed down along the perforating tips 71 until the bottom of the tin engages the ridges 70. With the described shape of the perforating tips 71 the power required for pressing the tips 71 across the tin is comparatively slight.

When the water has reached the desired temperature, the magnet valve 84 is opened so that the water can flow through the duct 86, the passage 102 and the coupling piece 101 and the passages 103 in the perforation tips 104 into the tin. Since the restriction disc 114 on the perforation tip 104 has a comparatively small passage, the water will flow gradually into the tin containing coffee or the like.

From the tin the liquid can flow away along the grooves 74 of the perforation tips 71, through the opening 50 in the packing 51 and the opening 52 in the bottom wall 35 of the compartment holding the coffee tin into the holder 25 arranged beneath said compartment.

The supply of water is blocked as soon as the liquid level in the trough 25 reaches the lower end of the sensor 57. After a waiting time required for the pressure built up in the tin to equalize the ambient pressure, in order to avoid the emergence of residual coffee from the tin, the motor 106 is actuated to move the screw spindle 100 back. If the tin should tend to stick to the perforation member 104, the tin is slipped off by the sleeve 47, which comes into contact with the top side of the tin. The structure is furthermore such that, if the perforation member 104 is withdrawn, the magnet valve 84 is transiently opened so that the passages 103 in the perforation member 104 are flushed in order to avoid blocking by residual coffee.

As a matter of course, the device comprises various safety members in the electrical circuit. The heating elements for the water in the boiler will become operative only when the detector in the tank has assessed that the water level has reached the desired height in the tank. In order to move down the spindle 100 the motor will become active when the temperature in the boiler reaches the desired value, whilst the magnet valve 84 is not opened until the perforator has been moved down over the desired distance. The thermostat mentioned above prevents overheating of the water.

The running period of the motor is limited to 40 seconds in order to prevent it from continuing running, if for example the connection between the motor shaft and the worm shaft 95 has become defective and thus no signal should be given to either of the terminal switches 110 or 111. The supply circuit of the motor includes a current inhibitor so that, if the motor requires too high a power, the supply to the motor is cut off.

It will be obvious that the use of the construction according to the invention described above provides an effective, advantageous assembly of the device.

Clearly the device can be used for coffee or for making other beverages.

We claim:

1. A device for making coffee or the like comprising a container, a compartment adapted to receive said container, a perforation unit disposed generally above said container, a boiler for heating water or the like, a substructure disposed generally below said compartment, a holder disposed in said substructure for receiving brewed coffee or the like, a cradle disposed below said substructure and provided with means for interconnection with water and electrical supplies, said substructure being provided with means for detachably engaging said means for interconnection with water and electrical supplies, and said substructure being provided with locking means for securing said substructure to said cradle.

2. A device as claimed in claim 1 wherein said substructure is formed of integral polyurethane foam having self-quenching properties.

3. A device as claimed in claim 1 wherein said holder is formed of integral polyurethane foam having self-quenching properties.

4. A device as claimed in claim 1 wherein said compartment comprises an open front side.

5. A device as claimed in claim 1 wherein said compartment is provided with means for fastening said perforation unit thereto.

6. A device as claimed in claim 1 wherein a water supply duct communicates with the bottom of said boiler, wherein a housing communicates with the interior of said boiler and wherein a float is disposed in said housing and is responsive to water flowing into said housing.

7. A device as claimed in claim 1 wherein a duct communicates with said boiler and wherein a pressure discharge valve is in communication with said duct and is arranged in said compartment.

8. A device as claimed in claim 1 wherein an outlet duct communicates with said boiler, wherein a reciprocatory perforation member is connected to said outlet duct and wherein a restriction disc is associated with said outlet duct and has a restricted passage for limiting the flow rate of water through said outlet duct.

9. A device as claimed in claim 1 wherein means is provided for passing a given quantity of water through said perforation unit when said perforation unit is withdrawn from the top of said container.

10. A device as claimed in claim 1 wherein said container is provided with upwardly extending perforation members.

11. A device as claimed in claim 8 wherein a magnet valve controls the communication between said boiler and said outlet duct.

12. A device for making coffee or the like comprising a container, a compartment adapted to receive said container, a perforation unit disposed generally above said container, a boiler for heating water or the like, a substructure disposed generally below said compartment, a holder disposed in said substructure for receiving brewed coffee or the like, a cradle disposed below said substructure and provided with means for interconnection with water and electrical supplies, said substructure being provided with means for detachably engaging said means for interconnection with water and electrical supplies, said cradle comprising a profile, a groove being provided on the bottom side of said substructure, said profile being disposed in said groove, and said cradle and said substructure being provided with centering pins.

13. A device for making coffee or the like comprising a container, a compartment adapted to receive said container, a perforation unit disposed generally above said container, a boiler for heating water or the like, a substructure disposed generally below said compartment, a holder disposed in said substructure for receiving brewed coffee or the like, a cradle disposed below said substructure and provided with means for interconnection with water and electrical supplies, said substructure being provided with means for detachably engaging said means for interconnection with water and electrical supplies, and a sensing member being displaceable substantially vertically between a lower position preventing lateral displacement of said holder and an upper position allowing removal of said holder.

14. A device as claimed in claim 13 wherein said sensing member is arranged rearwardly of said compartment, a pivotable handle is disposed on the front of said compartment, and said sensing member is coupled with said pivotable handle.

15. A device as claimed in claim 13 wherein a lid is disposed on said holder and comprises an opening for admitting the brewed coffee or the like and an opening allowing the passage of said sensing member.

16. A device for making coffee or the like comprising a container, a compartment adapted to receive said container, a perforation unit disposed generally above said container, a boiler for heating water or the like, a substructure disposed generally below said compartment, a holder disposed in said substructure for receiving brewed coffee or the like, a cradle disposed below said substructure and provided with means for interconnection with water and electrical supplies, said substructure being provided with means for detachably engaging said means for interconnection with water and electrical supplies, and said perforation unit comprising a reversible electric motor comprising a worm, a worm wheel, a nut, a spindle, and a perforation tip moveable in a vertical direction.

* * * * *